US006684060B1

(12) United States Patent
Curtin

(10) Patent No.: US 6,684,060 B1
(45) Date of Patent: Jan. 27, 2004

(54) DIGITAL WIRELESS PREMISES AUDIO SYSTEM AND METHOD OF OPERATION THEREOF

(75) Inventor: Steven D. Curtin, Freehold, NJ (US)

(73) Assignee: Agere Systems Inc., Allentown, PA (US)

(*) Notice: Subject to any disclaimer, the term of this patent is extended or adjusted under 35 U.S.C. 154(b) by 0 days.

(21) Appl. No.: 09/547,381

(22) Filed: Apr. 11, 2000

(51) Int. Cl.[7] .................................................. H04B 5/00
(52) U.S. Cl. ........................................ 455/41; 455/3.06
(58) Field of Search ........................... 455/41, 90, 3.06; 375/146, 147, 299, 219, 221, 225; 700/96

(56) References Cited

U.S. PATENT DOCUMENTS

| | | | | |
|---|---|---|---|---|
| 5,666,422 A | * | 9/1997 | Harrison et al. | 381/18 |
| 5,912,976 A | * | 6/1999 | Klayman et al. | 381/18 |
| 6,064,699 A | * | 5/2000 | Law | 375/244 |
| 6,292,440 B1 | * | 9/2001 | Lee | 369/7 |
| 6,466,832 B1 | * | 10/2002 | Zuqert et al. | 700/94 |
| 6,510,210 B1 | * | 1/2003 | Baughan | 379/90.01 |

OTHER PUBLICATIONS

"Bluetooth™—A Global Specification for Wireless Connectivity;" Specification of the Bluetooth System; Specification vol. 1; Bluetooth™; Dec. 1, 1999; Available at: http://www.bluetooth.com/developer/specification/specification-.asp on the World Wide Web.
** Note: The Applicant has cited the "Bluetooth™—A Global Specification for Wireless Connectivity," publication as a reference concerning the Bluetooth standard for the above patent application. The Applicant has included in this Information Disclosure Statement, the first 32 pages. The full publication is readily available at: "http://www.bluetooth.com/developer/specification/specification.asp" on the World Wide Web. The Application has not included the full Bluetooth publications, since it consists of 1,082 pages, and that the Bluetooth standard is readily available. If the Examiner requires the full publication, the Applicant will gladly submit the full publication.

"MPEG Audio," The MPEG Audio Web Page; 4 pgs; http://sound.media.mit.edu/mpeg4/audio/.

Rob Koenen; "Overview of the MPEG–4 Standard;" International Organisation for Standardisation Organisation Internationale de Normalisation; ISO/IEC/JTCI/SC29/WG11 N3156; Coding of Moving Pictures and Audio; Dec. 1999/Maui; 48 pgs.

William Casey, Director of Marketing & Sales; Lucent Technologies, Bell Labs Innovations; "What is PAC?"; Product Brief; Aug. 1999; PAC Versions 1&2 Family, Perceptual Audio Coder; Lucent Digital Radio; 5 pgs.; "http://www.lucent.com/ldr".

* cited by examiner

*Primary Examiner*—Nay Maung
*Assistant Examiner*—Tu Nguyen

(57) ABSTRACT

A digital wireless premises audio system, a method of operating the same and a home theater system incorporating the audio system or the method. In one embodiment, the audio system includes: (1) a digital audio encoder/transmitter, located on the premises, that accepts an audio channel in digital form, encodes the channel into a stream of digital data and wirelessly transmits the stream about the premises and (2) a speaker module, located on the premises, couplable to a power source and including, in series, a digital audio receiver/decoder, an audio amplifier and a speaker, that receives the stream, decodes the audio channel therefrom, converts the audio channel to analog form and employs power from the power source to amplify the audio channel and drive the speaker therewith.

29 Claims, 4 Drawing Sheets

*FIG. 3*

300

DISPLAY

| LOCATION | ID# |
|---|---|
| 1. LEFT FRONT | SM01 |
| 2. LEFT SURROUND | SM02 |
| 3. RIGHT FRONT | SM03 |
| 4. RIGHT SURROUND | SM04 |
| 5. CENTER | SM05 |
| 6. SUBWOOFER | SM06 |

DIGITAL WIRELESS PREMISES AUDIO SYSTEM AND METHOD OF OPERATION THEREOF

TECHNICAL FIELD OF THE INVENTION

The present invention is directed, in general, to audio and stereo systems and, more specifically, to a digital wireless premises audio system and method of operation thereof.

BACKGROUND OF THE INVENTION

Film sound track, television audio and music playback formats used to be distinctly different products of industries usually working in isolation. In recent years, however, this has changed. The popularity of surround sound, especially in the home, has brought these industries and their audio formats closer together. Now, digital multichannel technology is fostering an even more consistent approach to sound reproduction. This technology eases the burden on both consumer and producer while providing greatly enhanced fidelity not only to the tonality of live sound but also to its spatiality.

Historically, the first commercially successfully multichannel sound formats were developed in the early 1950s for the cinema. Stereophonic sound (i.e., stereo) was a new concept to the public and was heavily promoted along with the new wide-screen formats. Stereo film sound tracks use a minimum of four channels, unlike a home stereo system which use only two channels. The use of two channels for the home was not due to listener preference or some predisposition on the part of the audio profession, but rather that the then-prevalent LP phonograph recording standard accommodated a left channel and a right audio channel.

Quadraphonic (i.e., quad) sound was an attempt to provide the home with a sound characteristic that more closely resembled a film theater. However, due to a variety of different formats and standards, the home quad sound system never became very popular. Around 1975, Dolby® Stereo was introduced into the film industry. Instead of being based on magnetic striping, it used an optical soundtrack technology similar to monophonic sound used in the 1930s. Dolby® Stereo enabled the film industry to encode two physical tracks on movie prints with four channels of information: left, center, right and surround (rear). This was accomplished using matrixing techniques.

Although Dolby® stereo provided an advancement in sound quality, it and all of its predecessors are based on analog audio techniques. In the late 1980s, Dolby introduced digital audio techniques. Dolby® Digital 5.1 Surround provides five discrete full-range channels (left, center, right, left surround and right surround) plus a sixth channel for powerful low-frequency effects having about 10 percent of the bandwidth of the other channels. All six digital channels offer the same high quality as contrasted to Dolby® Stereo wherein all channel quality was not equal.

The compact disc (CD) has afforded only incremental improvement over the best analog formats. However, the digital versatile disc (DVD), employing Dolby® Digital 5.1 Surround capability, provides multichannel surround sound and improved sound quality over the CD. The DVD is bringing about a true revolution in the way that music is reproduced and enjoyed, especially in the home. Home theaters now have source program material that is superior to any analog or previous digital formats, which causes other sources of sound distortion to surface.

Although DVD source program material is digital in format, speaker systems are still being driven by high power analog signals that are delivered through physical wires. To minimize distortion and attenuation, the physical wires are usually extremely large in diameter (gauge). If the wiring runs are long, even these large diameter wires may still cause unwanted distortions in sound quality. The long speaker wires may create adverse impedance matching situations for an amplifier/driver thereby affecting fidelity.

Another problem associated with home theaters is trying to run the speaker wires in existing structures where access is restricted. Multiple speaker group locations being supplied from one amplifier/driver location typically exacerbate this problem. Finally, there are structures where the wiring for surround sound speakers cannot be accommodated without extensive modification to the structure.

Accordingly, what is needed in the art is a way to implement an audio system that provides increased flexibility and reduces distortion.

SUMMARY OF THE INVENTION

To address the above-discussed deficiencies of the prior art, the present invention provides a digital wireless premises audio system, a method of operating the same and a home theater system incorporating the audio system or the method. In one embodiment, the audio system includes: (1) a digital audio encoder/transmitter, located on the premises, that accepts an audio channel in digital form, encodes the channel into a stream of digital data and wirelessly transmits the stream about the premises and (2) a speaker module, located on the premises, couplable to a power source and including, in series, a digital audio receiver/decoder, an audio amplifier and a speaker, that receives the stream, decodes the audio channel therefrom, converts the audio channel to analog form and employs power from the power source to amplify the audio channel and drive the speaker therewith.

"Premises" is defined for purposes of the present invention as being a location. For example, "premises" may be one or more rooms in a building (such as a home) or a theater. Premises may also be any vehicle, such as a car, boat or airplane.

The present invention therefore introduces the broad concept (and resulting substantial utility) of (1) distributing the audio channels carried in an audio system in digital form to the speaker(s) to eliminate distortion that distribution of the audio channels over speaker cable in analog form would have caused and (2) transmitting the audio channels wirelessly to avoid the need for speaker cables (the digital form of the audio channels further serving to eliminate distortion that wireless distribution of analog audio channels would have caused).

In one embodiment of the present invention, the digital audio encoder/transmitter accepts a plurality of audio channels in digital form, encodes the plurality of channels into a stream of digital data and wirelessly transmits the stream about the premises, the system further including a plurality of speaker modules, located on the premises, that receives the stream and decode respective ones of the plurality of audio channels therefrom. Thus, the system may have only one channel and one or more speaker modules (typical of a public address system) or may have more than one channel and one or more speaker modules per channel (typical of a stereo, hi-fi or home theater system).

In one embodiment of the present invention, the power source is a line power source for the premises. In this embodiment, each speaker module may be plugged into a common wall outlet to derive the power required to amplify its audio channel. Alternatively, a power cable may couple the digital audio encoder/transmitter or another central source to each of the speaker modules (either in series or in parallel) to provide the necessary power.

In one embodiment of the present invention, the digital audio encoder/transmitter includes an analog to digital converter that generates the audio channel in digital form. Thus, the digital audio encoder/transmitter may be fitted with an analog-to-digital converter "front end" to allow the encoder/transmitter to receive signals from conventional analog equipment, such as a compact disc (CD) player, audio cassette deck, video cassette recorder (VCR) or phonograph.

In one embodiment of the present invention, the speaker module further includes a channel selector, coupled to the digital audio receiver/decoder, that identifies an audio channel to be decoded from the stream. For example, a stereo may have channels "A" and "B." In such system, the speaker modules may have channel selectors allowing them to reproduce sounds from either channel "A" or "B," depending upon how a user may configure the channel selector. Those skilled in the art will understand the flexibility that this lends to a particular system, but will also understand that the present invention does not require this flexibility.

In one embodiment of the present invention, the stream conforms to a Bluetooth™ standard. The Bluetooth™ standard is set forth in "Bluetooth™—A Global Specification for Wireless Connectivity", which is available at html://www.bluetooth.com/developer/specification/specification.asp on the World Wide Web and is incorporated herein by reference.

In one embodiment of the present invention, the audio channel conforms to a standard selected from the group consisting of: (1) two-channel stereo, (2) four-channel quadraphonic, (3) Dolby® Stereo, (4) Dolby® Digital 5.1 Surround, (5) DTS™ Surround 5.1 , (6) PAC Stereo Audio (commercially available from Lucent Technologies, Inc., Murray Hill, N.J.), and (7) MP-3 Stereo Audio. Those skilled in the pertinent art will understand that the systems and methods of the present invention are in no way limited to a particular protocol, format or configuration of channel or channel encoding.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which:

FIG. 3 illustrates a diagram of a display 300 showing an embodiment of speaker module information associated with the digital audio encoder/transmitter of FIG. 2.

DETAILED DESCRIPTION

Figure 1:
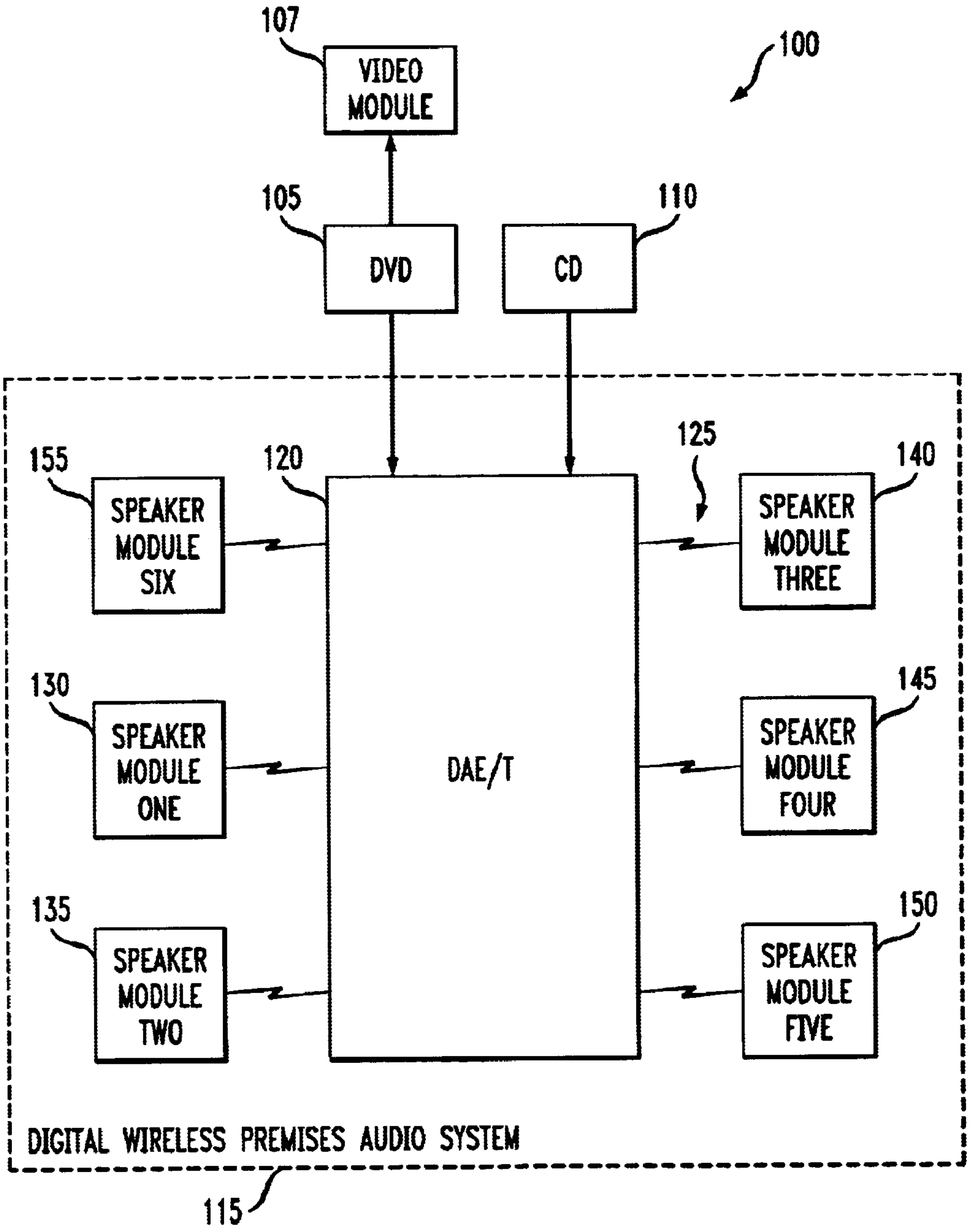
FIG. 1 illustrates a block diagram of an embodiment of a theater audio system constructed according to the principles of the present invention.

Referring initially to FIG. 1, illustrated is a block diagram of an embodiment of a theater audio system 100 constructed according to the principles of the present invention. The theater audio system 100 includes a source of theater programming from a Digital Versatile Disk (DVD) 105 and a Compact Disk (CD) 110. The theater audio system 100 further includes a video module 107 and a digital wireless premises audio system 115 that receives a plurality of audio channels for playback in a home or other type of theater. The digital wireless premises audio system 115 includes a digital audio encoder/transmitter (DAE/T) 120, a wireless transmission 125 and first, second, third, fourth, fifth and sixth speaker modules 130, 135, 140 145, 150, 155, collectively referred to as the speaker modules 130–155.

The DVD 105 may provide the plurality of audio channels to the digital wireless premises audio system 115 and video to the video module 107. Audio from the DVD 105 may include several formats depending on the type of encoding of the DVD 105. These audio channels typically conform to a standard audio format. The standard audio format used may be two-channel stereo, four-channel quadraphonic, Dolby® Digital Stereo, Dolby® Digital 5.1 Surround, DTS® Surround 5.1 , PAC Stereo Audio, or MP-3 Stereo Audio. Alternatively, the CD 110 may provide the plurality of audio channels to the digital wireless premises audio system 115. Those skilled in the pertinent art will understand that the systems and methods of the present invention are in no way limited to a particular protocol, format, audio standard or configuration of channel or channel encoding.

In the illustrated embodiment, the DAE/T 120 accepts the plurality of audio channels and encodes them into a stream of digital data having six channels for transmission to the speaker modules 130–155. This transmission employs the wireless transmission 125 about the premises, which may constitute a home or other type of theater arrangement. In one embodiment, the DAE/T 120 accepts six parallel audio channels from the DVD 105 provided in a Dolby® Digital 5.1 Surround format. This format provides one audio channel for each of the speaker modules 134–155 that would otherwise conventionally be distributed separately over separate interconnecting wires.

However, in the illustrated embodiment, the DAE/T 120 encodes these six separate audio channels into a single digital audio bit stream for wireless transmission. The DAE/T 120 includes at least one analog to digital converter (ADC) to convert an analog input to digital form, as required. Thus, the DAE/T120 may be fitted with an ADC "front end" to allow the encoder/transmitter to receive signals from conventional analog equipment, such as the CD 110, or alternatively, an audio cassette deck, a video cassette recorder (VCR) or a phonograph.

Each of the six parallel audio input channels contains a digital word that is organized into a particular time sample by the DAE/T 120. Intended speaker module information is added to each digital word time sample packet to form a speaker module packet containing digital speaker module destination and audio amplitude information. The collection of six separate speaker packets is then encoded for transmission into the single audio bit stream in a time division multiplexed fashion. In an alternative embodiment of the present invention, the DAE/T 120 may accept an existing digital bit stream, such as a Dolby® Digital bit stream that is used to feed a Dolby® Digital decoder, and reformat it for transmission to the speaker modules 130–155.

Transmission of the audio bit stream may be accomplished using transmission technology, standards and formats that are proprietary, special, customized or publicly available. A publicly available technology is Bluetooth™, which provides an open specification for wireless communication of data and voice. It is based on a low-cost, short-range radio link built into a microchip, which facilitates protected connections for stationary and mobile environments. Bluetooth™ currently operates in the unlicensed ISM band at 2.4 gigahertz and accommodates full-duplex transmission. The Bluetooth™ standard is set fourth in "Bluetooth™—A Global Specification for Wireless Connectivity", which is available at html://www.bluetooth.com/developer/specification/specification.asp on the World Wide Web and is incorporated herein by reference.

In one embodiment, the level of power associated with the transmission of the stream of digital data from the DAE/T 120 may be adjusted (not shown). The power adjustment can adjust the transmission level of the DAE/T 120 to allow the wireless transmission 125 to remain within a premises boundary. Additionally, the DAE/T 120 may adjust the focus of the wireless transmission 125 from being omnidirectional to being more focused toward the speaker modules 130–155 or as circumstances dictate.

In an alternative embodiment, additional groups of speaker modules, located on the premises in areas other than the speaker modules 130–155, may be employed to receive the wireless transmission 125. Unless the DAE/T 120 is centrally located to all of the speaker module groups, which is rarely the case, the wireless transmission 125 may not adequately serve all of the premises and remain within the closest premises boundary. If premises distribution is lopsided between the DAE/T 120 and other speaker module groups, judiciously located wireless repeaters (not shown) may be employed to enhance and extend the wireless transmission 125 from the DAE/T 120 to serve all speaker module groups within the premises. These wireless repeaters may also typically have power adjustment and transmission focus capabilities.

Each of the speaker modules 130–155, located on the premises, is coupled to a power source and receives the wireless transmission 125 having the encoded bit stream of digital data. One of the plurality of audio channels from the digital data stream is decoded by each of the speaker modules 130–155. This decoded audio channel is appropriate to a particular one of the speaker modules 130–155. Additionally, this decoded audio channel is then converted from a digital format into an analog format for amplification to drive a speaker at this appropriate one of the speaker modules 130–155. In an alternative embodiment, some or all of the speaker modules 130–155 may have more than one speaker module that decodes a particular audio channel. This arrangement may be necessary to appropriately distribute sound for larger areas. In a second alternative embodiment, a theater audio system may have only one channel and one or more speaker modules that all utilize the one channel. This embodiment may be typical of a public address system, for example.

Figure 2:
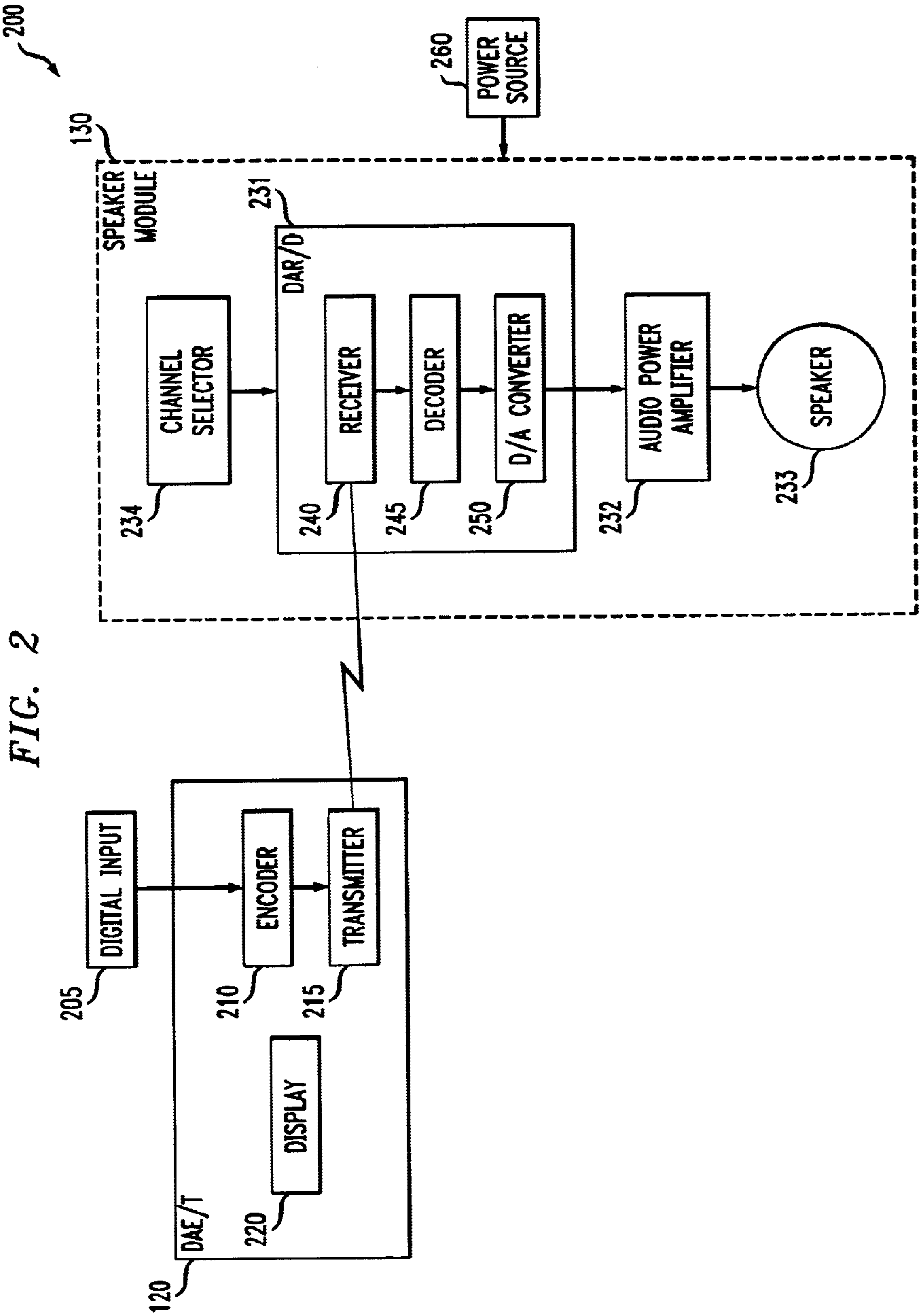
FIG. 2 illustrates a is a block diagram of an embodiment of a digital wireless premises audio system constructed according to the principles of the present invention.
Figure 4:
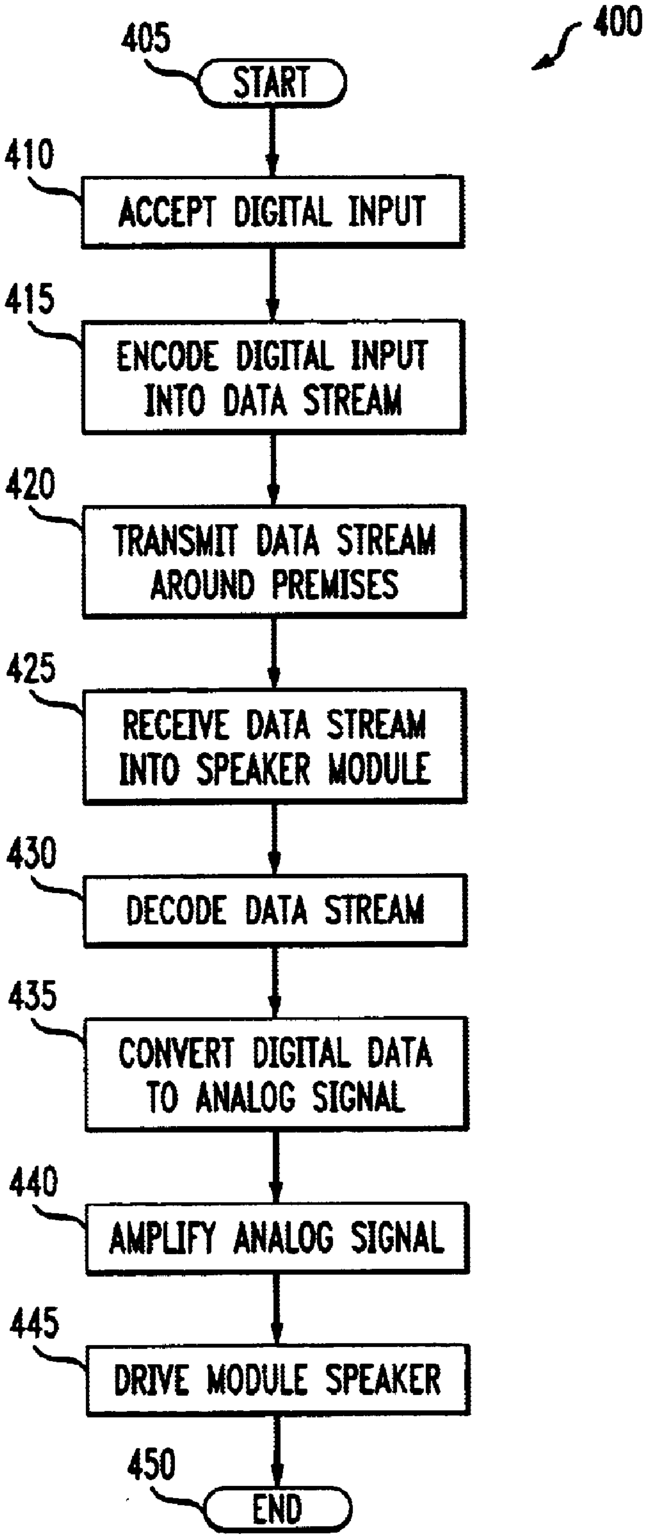
FIG. 4 illustrates a flow diagram depicting a method of distributing an audio channel about a premises constructed according to the principles of the present invention.

Turning now concurrently to FIGS. 2 and 4, illustrated are a block diagram of an embodiment of a digital wireless premises audio system 200 (FIG. 2) and the corresponding method of distributing an audio channel about a premises (FIG. 4) constructed according to the principles of the present invention. The digital wireless premises audio system 200 includes the DAE/T 120, the wireless transmission 125 and the first speaker module 130, which is representative of the speaker modules 130–155.

The DAE/T 120, which receives a digital input signal 205, includes an encoder 210, a transmitter 215 and a display 220 used to show status information of the DAE/T 120. The speaker module 130 includes a digital audio receiver/decoder (DAR/D) 231, an audio power amplifier 232 and a speaker 233. The DAR/D 231 includes a receiver 240, a decoder 245 and a digital to analog (D/A) converter 250. In an alternate embodiment, the DAR/D 231 may be a separate module couplable to the speaker module 130.

The speaker module 130 is also coupled to a power source 260. In the illustrated embodiment, the power source 260 is a line power source for the premises. Each of the speaker modules 130–155 may be plugged into a common wall outlet to derive the power required to amplify its audio channel. Alternatively, a power cable may couple the DAE/T 120 or another central source to each of the speaker modules 130–155. This coupling may be either in series or in parallel to provide the necessary power.

Each of the speaker modules 130–155 also includes a channel selector 234 that identifies an audio channel to be decoded from the stream. For example, a stereo program may have channels "A" and "B." In such system, the speaker modules may have channel selectors allowing them to reproduce sounds from either channel "A" or "B," depending upon how a user may configure the channel selector. In an alternative embodiment, each of the speaker modules 130–155 may be preset to identify an audio channel to be decoded from the stream. This would typically require that at least one of the speaker modules 130–155 has a predetermined role and therefore a designated location in a theater environment. In a second alternative embodiment, each of the speaker modules 130–155 identity may be set by the DAE/T 120. Those skilled in the pertinent art will understand the flexibility that this lends to a particular system, but will also understand that the present invention does not require this flexibility.

The digital wireless premises audio system's DAE/T 120 first receives a digital input 205 which represents a plurality of audio channels in a step 405. Within the DAE/T 120, the encoder 210 accepts the digital input 205, in a step 410, which is in a six parallel channels format. The encoder 210 then encodes the digital input 205 into a single data stream delineating a collection of samples in time for the speaker modules 130–155, in a step 415. In the illustrated embodiment, these data samples constitute a time division multiplex arrangement wherein six digital words are arranged into a packet frame constituting six speaker module packets. In an alternate embodiment, the DAE/T 120 does not include the encoder 210 and the digital input is already encoded into a data stream prior to the DAE/T 120 receiving it.

Recall that each of the speaker module packets contains speaker module destination and audio amplitude information. In the illustrated embodiment, the audio amplitude information is contained in 24 bits providing an audio dynamic range of 144 dB for the speaker 233. Additionally, the speaker module destination information is contained in an additional 8 bits, which allows up to a maximum of 256 speaker modules to be delineated. Of course, this speaker module packet length and organization may be modified to accommodate present or future requirements as required.

Also, the packet frame may contain additional bits as may be required for synchronization. The transmitter 215 accepts the encoded digital data stream and transmits this data stream around the premises generating the wireless transmission 125 in a step 420.

Within the DAR/D 231, the wireless transmission 125 is received by the receiver 240 in a step 425. The receiver 240 accepts the encoded data stream and formats it for presentation to the decoder 245. Then in a step 430, the decoder 245 inspects each packet frame presented by the receiver 240 and selects the speaker module packet designated for the first speaker module 130 as delineated in the 8 bits of the speaker module destination information. Then the 24 bits representing the audio amplitude in this sample are formatted into a 24 bit parallel digital word for presentation to the D/A converter 250.

The D/A converter 250 converts the digital word decoded from the digital data stream into an analog signal suitable for use in driving the speaker 233 in a step 435. The analog signal, from the step 435, is processed by the audio power amplifier 232 in a step 440. The audio power amplifier 232 then drives the speaker 233 in a step 445. The method ends in a step 450.

One skilled in the art should know that the present invention is not limited to representing the speaker module destination and audio amplitude information in any particular number of bits. Nor is the present invention limited to transmission of information to the speaker modules in a time division multiplex arrangement. In another embodiment, the DAE/T and the DAR/D may use different encoding and transmission formats. Also, other embodiments of the present invention may have additional or fewer steps than described above.

Turning now to FIG. 3, illustrated is a diagram of a display 300 showing an embodiment of speaker module information associated with the DAE/T 120 of FIG. 2. The display 300 provides an identification of the location of each of the speaker modules 130–155. This display information facilitates confirmation that the capability of a particular speaker module and its location in the theater are congruent. Of course, other display formats are possible, such as a pictorial speaker module display indicating their location graphically (not shown).

In summary, the present invention introduces, in one aspect, the broad concept and resulting substantial utility of distributing the audio channels carried in an audio system both wirelessly and in digital form to a speaker or speakers. This wireless, digital distribution greatly reduces the distortion caused by analog signal distribution employing speaker cable or the comparative distortion arising from the wireless, analog transmission of audio channels.

Although the present invention has been described in detail, those skilled in the art should understand that they can make various changes, substitutions and alterations herein without departing from the spirit and scope of the invention in its broadest form.

What is claimed is:

1. A digital wireless premises audio system, comprising:

a digital audio encoder/transmitter, located on said premises, that accepts a plurality of audio channels in digital form, encodes said plurality of audio channels into a stream of digital data and wirelessly transmits said stream about said premises; and a plurality of speaker modules, located on said premises, couplable to a power source and including, in series, a digital audio receiver/decoder, an audio amplifier and a speaker, that receives said stream, decodes respective ones of said plurality of audio channels therefrom, converts said respective ones of said plurality of audio channels to analog form and employs power from said power source to amplify said respective ones of said plurality of audio channels and drive said speaker therewith.

2. The system as recited in claim 1 wherein said power source is a line power source for said premises.

3. The system as recited in claim 1 wherein said digital audio encoder/transmitter includes an analog to digital converter that generates said audio channel in digital form.

4. The system as recited in claim 1 wherein said speaker module further includes a channel selector, coupled to said digital audio receiver/decoder, that identifies an audio channel to be decoded from said stream.

5. The system as recited in claim 1 wherein said stream conforms to a Bluetooth™ standard.

6. The system as recited in claim 1 wherein said audio channel conforms to a standard selected from the group consisting of:

two-channel stereo, four-channel quadraphonic,

Dolby® Stereo,

Dolby® Digital 5.1 Surround,

DTSTM Surround 5.1,

PAC Stereo Audio, and

MP-3 Stereo Audio.

7. A method of distributing a plurality of audio channels about a premises, comprising:

accepting said plurality of audio channels in digital form;

encoding said plurality of audio channels into a stream of digital data;

wirelessly transmitting said stream about said premises;

receiving said stream into a speaker module, located on said premises;

decoding, in said speaker module, only one of said plurality of audio channels from said stream;

converting said one of said plurality of audio channels to analog form; and employing power from a power source coupled to said speaker module to amplify said one of said plurality of audio channels and drive a speaker therewith.

8. The method as recited in claim 7, wherein said power source is a line power source for said premises.

9. The method as recited in claim 7, wherein said digital audio encoder/transmitter includes an analog to digital converter that generates said audio channel in digital form.

10. The method as recited in claim 7, further comprising identifying an audio channel to be decoded from said stream.

11. The method as recited in claim 7, wherein said stream conforms to a Bluetooth™ standard.

12. The method as recited in claim 7, wherein said audio channel conforms to a standard selected from the group consisting of:

two-channel stereo, four-channel quadraphonic,

Dolby® Stereo,

Dolby® Digital 5.1 Surround,

DTSTM Surround 5.1,

PAC Stereo Audio, and

MP-3 Stereo Audio.

13. A theater audio system, comprising:

a source of theater programming that generates a plurality of audio channels for playback in a theater;

a digital audio encoder/transmitter, coupled to said source of theater programming, that accepts said plurality of audio channels, encodes said plurality of audio channels into a stream of digital data and wirelessly transmits said stream about said theater; and a plurality of speaker modules, located about said theater, couplable to a power source and each including, in series, a digital audio receiver/decoder, an audio amplifier and a speaker, that receives said stream, decodes one of said plurality of audio channels therefrom, converts said audio channel to analog form and employs power from said power source to amplify said audio channel and drive said speaker therewith.

14. The system as recited in claim 13 wherein said power source is a line power source for said theater.

15. The system as recited in claim 13 wherein said digital audio encoder/transmitter includes an analog to digital converter that generates said audio channel in digital form.

16. The system as recited in claim 13 wherein each of said plurality of speaker modules further includes a channel selector, coupled to each of said plurality of digital audio receiver/decoder, that identifies one of said plurality of audio channels to be decoded from said stream.

17. The system as recited in claim 13 wherein said stream conforms to a Bluetooth™ standard.

18. The system as recited in claim 13 wherein said audio channel conforms to a standard selected from the group consisting of:

two-channel stereo, four-channel quadraphonic,

Dolby® Stereo,

Dolby® Digital 5.1 Surround,

DTSTM Surround 5.1,

PAC Stereo Audio, and

MP-3 Stereo Audio.

19. For use with digital wireless premises audio encoder/transmitter that accepts a plurality of audio channels in digital form, encodes said plurality of audio channels into a stream of digital data and wirelessly transmits said stream about said premises, a digital wireless premises audio receiver comprising:

a digital audio receiver/decoder module, located on said premises and couplable to a power source and a speaker, that receives said stream, decodes one of said plurality of audio channels therefrom, converts said one of said plurality of audio channels to analog form suitable for use in driving said speaker therewith.

20. The digital wireless premises audio receiver as recited in claim 19 wherein said power source is a line power source for said premises.

21. The digital wireless premises audio receiver as recited in claim 19 wherein said digital audio receiver/decoder module further includes a channel selector that identifies an audio channel to be decoded from said stream.

22. The digital wireless premises audio receiver as recited in claim 19 wherein said stream conforms to a Bluetooth™ standard.

23. The digital wireless premises audio receiver as recited in claim 21 wherein said audio channel conforms to a standard selected from the group consisting of:

two-channel stereo, four-channel quadraphonic,

Dolby® Stereo,

Dolby® Digital 5.1 Surround,

DTSTM Surround 5.1,

PAC Stereo Audio, and

MP-3 Stereo Audio.

24. A digital wireless premises audio system, comprising:

a digital encoded audio transmitter, located on said premises, that accepts an encoded audio channel in digital form and wirelessly transmits said encoded audio channel about said premises, wherein said encoded audio channel contains a plurality of audio channels encoded into a single channel; and a speaker module, located on said premises, couplable to a power source and including, in series, a digital audio receiver/decoder, an audio amplifier and a speaker, that receives said encoded audio channel, decodes one of said plurality of audio channels therefrom, converts said one of said plurality of audio channels to analog form and employs power from said power source to amplify said one of said plurality of audio channels and drive said speaker therewith.

25. The system as recited in claim 24 further comprising:

a plurality of speaker modules, located on said premises, that receives said encoded audio channel and decodes respective ones of said plurality of audio channels therefrom.

26. The system as recited in claim 24 wherein said power source is a line power source for said premises.

27. The system as recited in claim 24 wherein said speaker module further includes a channel selector, coupled to said digital audio receiver/decoder, that identifies an audio channel to be decoded from said encoded audio channel.

28. The system as recited in claim 24 wherein said digital encoded audio transmitter wirelessly transmits said encoded audio channel according to a Bluetooth™ standard.

29. The system as recited in claim 24 wherein said encoded audio channel conforms to a standard selected from the group consisting of:

Dolby® Stereo,

Dolby® Digital 5.1 Surround,

DTSTM Surround 5.1,

PAC Stereo Audio, and

MP-3 Stereo Audio.

* * * * *